Dec. 9, 1969  E. C. STEWART  3,482,706
PANELLING ARRANGEMENT FOR SUPPORTING SHELVES AND OTHER FITMENTS
Filed Sept. 27, 1967  4 Sheets-Sheet 1

Eric C. Stewart
INVENTOR

BY
Lawrence C. Laubscher
ATTORNEY

Dec. 9, 1969   E. C. STEWART   3,482,706
PANELLING ARRANGEMENT FOR SUPPORTING SHELVES AND OTHER FITMENTS
Filed Sept. 27, 1967   4 Sheets-Sheet 2

Eric C. Stewart
INVENTOR

BY
Lawrence E. Laubscher
ATTORNEY

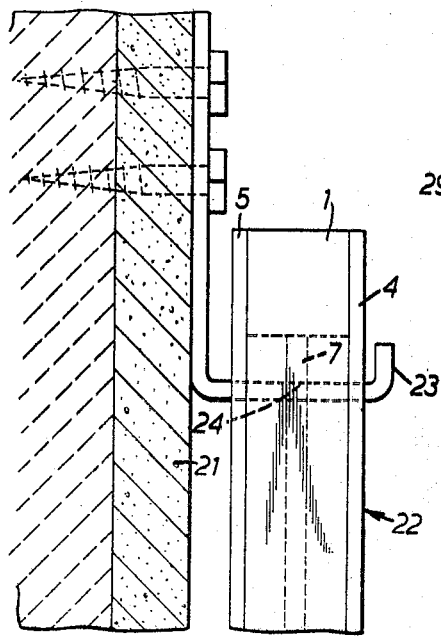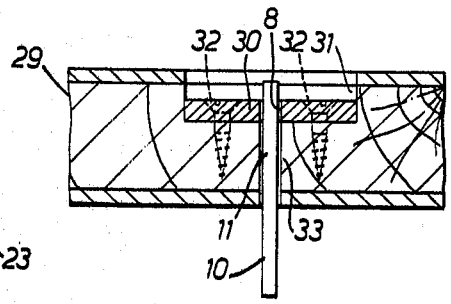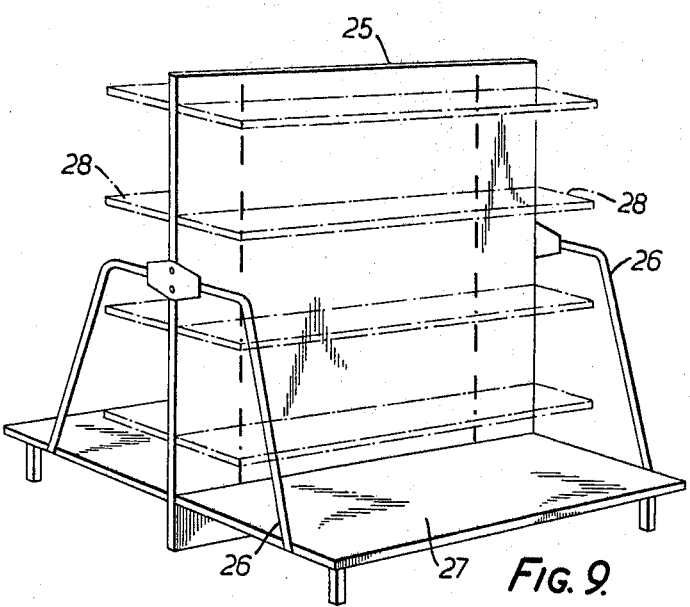

Dec. 9, 1969  E. C. STEWART  3,482,706
PANELLING ARRANGEMENT FOR SUPPORTING SHELVES AND OTHER FITMENTS
Filed Sept. 27, 1967  4 Sheets-Sheet 4

Eric C. Stewart
INVENTOR

BY
Lawrence E. Laubscher
ATTORNEY

United States Patent Office 3,482,706
Patented Dec. 9, 1969

3,482,706
PANELLING ARRANGEMENT FOR SUPPORTING SHELVES AND OTHER FITMENTS
Eric C. Stewart, 61 Harefield Road, Hertfordshire, Rickmansworth, England
Filed Sept. 27, 1967, Ser. No. 670,877
Claims priority, application Great Britain, Sept. 29, 1966, 43,597/66; May 3, 1967, 20,575/67
Int. Cl. A47f 5/08; A47g 29/02
U.S. Cl. 211—87        8 Claims

ABSTRACT OF THE DISCLOSURE

The invention comprehends a panel which incorporates metal strips substantially confined within the panel extremities and which are slotted so that hook-type brackets may be engaged to the strips and thus to the panel. The panel, therefore, may be regarded as incorporating its own uprights by which to be fixed to a wall or other vertical surface, if wished. For such fixing purposes, pre-positioned fixing holes are provided in the panel which extend through the metal strips, the holes not only serving as screw housings but also permitting centre marks to be made through them in the wall so that the panel itself serves as a marking-out template. The metal strips may be embedded in battens forming part of the panel. Such battens together with the metal strips then constituting uprights within the panel which may be made separately therefrom, if desired.

---

This invention is concerned with improvements in or relating to supports for shelving brackets and like fitments.

According to one aspect of the invention there is provided a panel incorporating rigid bracket support means substantially confined within the panel extremities, said rigid bracket support means being slotted to receive and engage a hook-type bracket in any one of a number of selected vertical positions to the panel.

According to another aspect of the invention, there is provided an upright in which is incorporated rigid bracket support means substantially confined within the extremities of the upright, said rigid bracket support means having slots by which a hook-type bracket can be engaged in any of a plurality of predetermined vertical positions with the upright.

Figure 1:
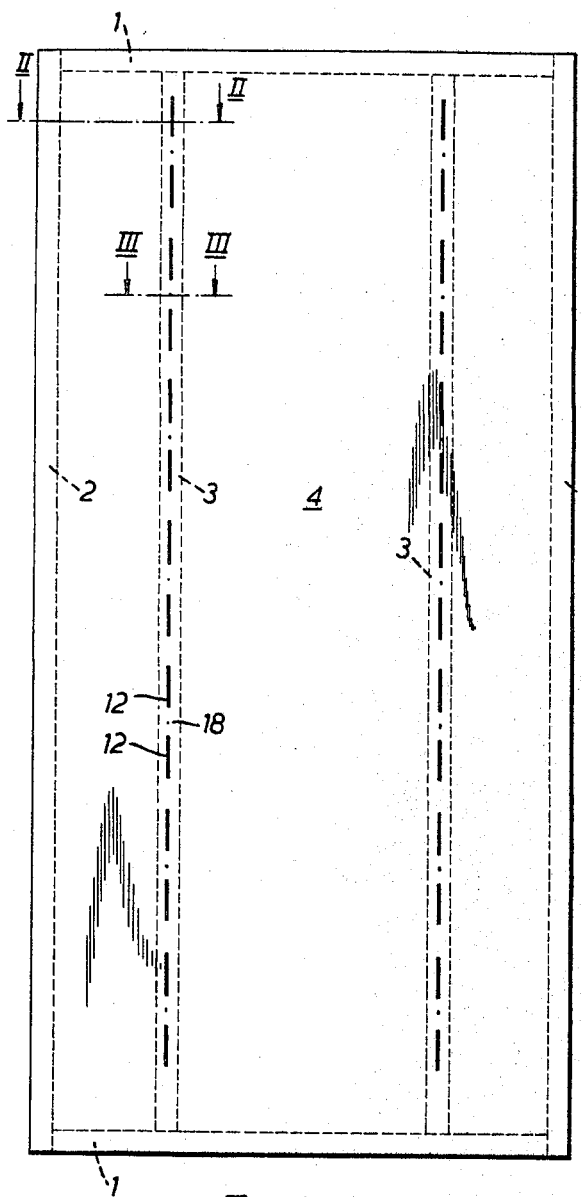
Figure 7:
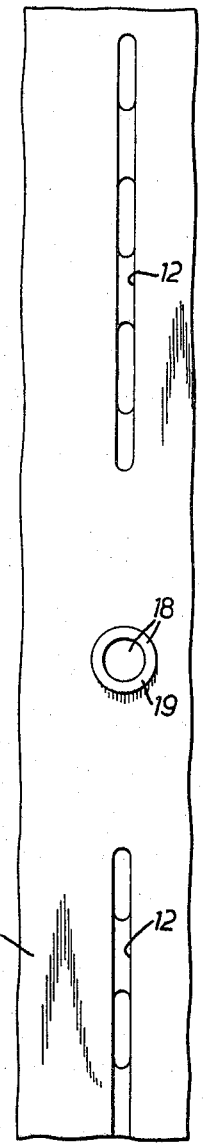
Figure 2:
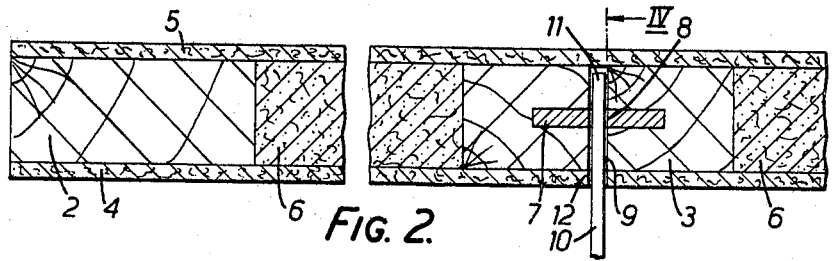
Figure 3:
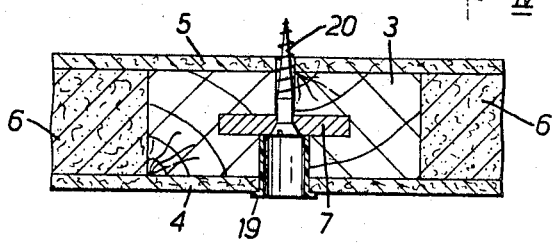
Figure 4:
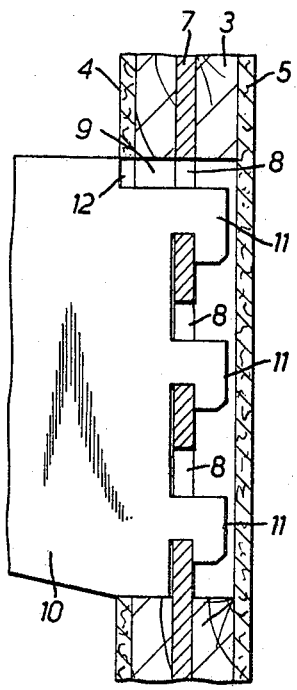
Figure 5:
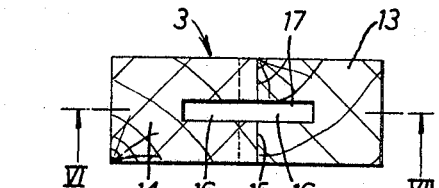
Figure 6:
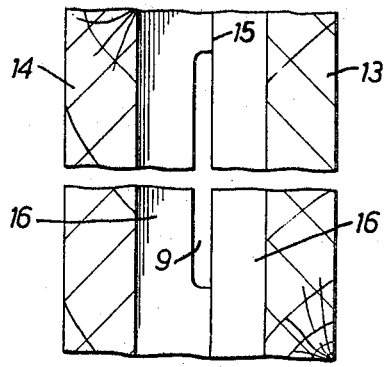
Figure 11:
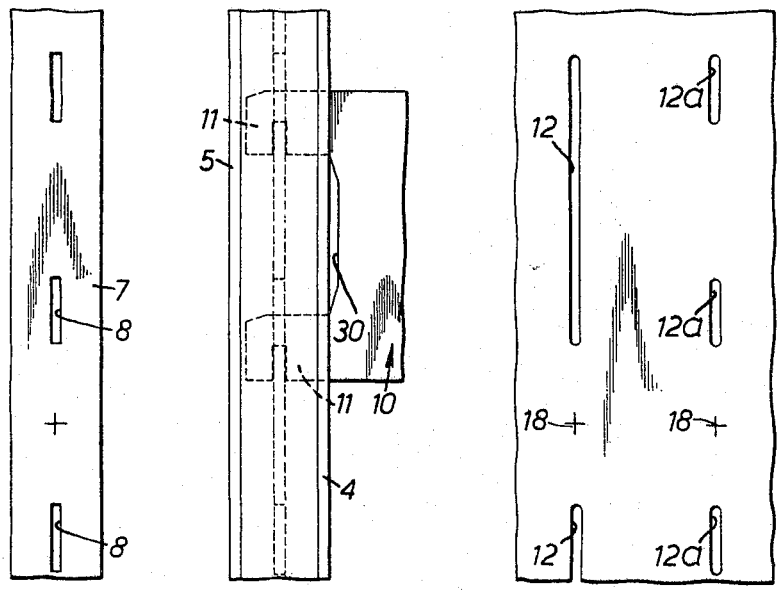
Figure 12:
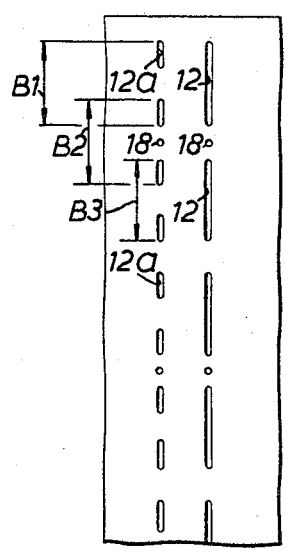
Figure 13:
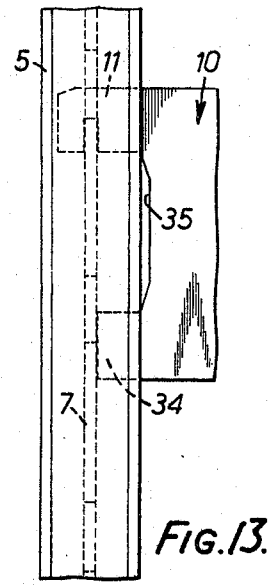

In order that the invention may be well understood there will now be described some embodiments thereof, given by way of example only, reference being had to the accompanying drawings, in which:

FIGURE 1 is a front elevation of a panel;
FIGURE 2 is a detailed section along the line II—II of FIGURE 1;
FIGURE 3 is a detalied section along the line III—III of FIGURE 1;
FIGURE 4 is a cross section along the line IV—IV of FIGURE 2;
FIGURE 5 is a plan view of a type of batten incorporated in said panel;
FIGURE 6 is a cross section along the line VI—VI of FIGURE 5;
FIGURE 7 is a detailed front elevation to a larger scale of said panel;
FIGURE 8 is a detailed cross section of said panel hung against a wall;
FIGURE 9 is a perspective view of said panel incorporated in a free-standing display unit;
FIGURE 10 is a detailed section taken from an aspect smiliar to that of FIGURE 2 but through an alternative panel;
FIGURE 11 diagrammatically illustrates further alternative panel and bracket constructions;
FIGURE 12 diagrammatically illustrates alternative patterning of the panel and the bracket positions available utilizing the constructions of FIGURE 11; and
FIGURE 13 is a sketch of another bracket hooked into a panel.

In the various figures, like references indicate like parts.

Referring first to FIGURES 1 to 7, the panel shown therein has a peripheral frame formed by horizontal battens 1 and vertical battens 2 secured together in any suitable manner at the corners of the panel. Those battens may be of softwood. Inset from the battens 2 is another pair of battens 3 which extend vertically between the battens 1 and which are joined thereto, again in any suitable fashion. Front and back sheets 4 and 5 respectively are attached to the opposite sides of the frame and battens 3 in any desired manner. A filler 6 which may be expanded polystyrene or industrial fibre filler is provided in the volume between the sheets 4 and 5 not occupied by battens. The battens 3 may be of constructional hardwood. The sheets 4 and 5 may be of hardboard, asbestos sheeting, a laminate, or Formica. Whatever the material of the sheets may be, at least the front sheet 4 would have an attractive frontal appearance, and would be treated accordingly by any standard finishing process, as necessary. As so far described, therefore, the panel is bounded by a rigid frame, is enclosed by a pair of facings, at least the frontal one of which has a pleasing appearance, and has intermediate vertical battens 3.

The vertical battens 3 incorporate metal strips 7 which may extend the length of those battens or be inset from the ends thereof, as wished. Each strip has a number of sets of slots or apertures 8, there being three slots in each set, and in the present example, fourteen sets in all so that, as will later be realized, that number of vertical positions is available to a bracket fitted to the panel. Whilst in the present construction there are three sets in a slot, that number can be varied to suit the number of hooks of the bracket. A three slot set would accommodate a bracket with three hooks. There need, however, only be one slot in a "set" to support a one-hook bracket. As will be realized, the two metal strips 7 are aligned so that a pair of shelving brackets, for example, may be fitted to them in horizontal alignment with each other and so together support a horizontal shelf against the panel.

In order to provide access to the slots 8 in the metal strips 7, each batten 3 has a series of slots 9 extending through its thickness in line with the sets of slots 8. As will be seen in FIGURE 4, a slot 9 is slightly longer than the overall length of a set of slots 8, and this is to permit a bracket 10 to be inserted into the panel with its hooks 11 aligned with the slots 8 and then moved downwardly to engage those hooks with the strip. Of course, the front sheet 4 is slotted at 12 similarly to the battens 3. The back sheet 5 may be likewise slotted, although such is not illustrated, depending on the degree of clearance required for the bracket hooks.

The battens 3 are each constructed of two sections 13 and 14 as shown in FIGURES 5 and 6 and are joined to each other, as by gluing, along a longitudinal joining line 15. Each section is longitudinally recessed at 16, the two recesses together providing a vertical channel or housing 17 for a metal strip 7 which is secured within the batten when the two sections are glued together. The section 13 has a planar face adjacent the other section 14, but the latter section is slotted at intervals along its length, and it is these slots which comprise the described slots 9 in the composite batten. The construction provides for relatively simple manufacture of a batten with a metal strip insert.

The panel is constructed with pre-positioned fixing holes serving as screw housings such that the panel itself can be used as a drilling template. Thus, fixing holes 18 are provided in the front sheet 4 between each alternate pair of slots 12 to give a dash-dot-dash repeated pattern effect thereon, as shown in FIGURES 1 and 7. That fixing hole is continued in the batten 3 up to the metal strip 7 therein, and a plastic or metal bush 19, illustrated best in FIGURE 3, is inserted therein. The internal diameter of each bush is such as to receive fixing screws, such as the screw 20, and the metal strip 7 is appropriately apertured in line with those fixing holes, so that the screw can be screwed home into a suitably prepared wall or block support thereon to secure the panel to the wall, the head of the screw engaging in or on the metal strip, and the screw shank passing through the aligned apertures in the batten region at the rear side of the strip and the back sheet respectively. To use the panel as a drilling template, the panel would be positioned against the wall which it is to face, and centre marks would be made in the wall through the "empty" fixing holes. Thus, the construction provides for quick and easy accurate marking-out of the wall and facilitates securing of the panel in position. The panel may be fixed directly to the wall, when the wall surface is smooth, or fixed to a suitable backing, such as wooden blocks, previously secured in any suitable manner to the wall, in the case of the wall surface being sufficiently uneven to warrant the use of a backing.

Whilst in the described embodiment the composite batten and strip insert is an integral part of the panel, it could be separate therefrom and serve as an upright.

The panel may also be hung against a wall 21 as shown in FIGURE 8. Therein the panel, referenced 22 is hung from a pair of brackets 23 which pass through horizontal slots 24 in the metal strips 7 and other parts of the panel aligned therewith. A firmer fixing may be obtained by screwing the lower region of the panel to the wall, again using the panel as a drilling template by marking through the fixing holes after the panel has been hooked on the brackets 22.

A particular feature of the panel is that since the strips 7 are well inserted in the battens 3 and only relatively narrow slots are provided in front of them they are substantially hidden from view as also are the inserted fixing screws so that, if at all, they will be barely noticed, the predominant feature of the panel being the described dash-dot-dash pattern.

In another installation, the panel could be well spaced from a wall and suitably tied thereto.

Again, the panel need not necessarily be fixed to a wall, but could be incorporated in a free-standing display unit, such as shown in FIGURE 9. The panel here is referenced 25 and is supported by bracing frames 26 upstanding of a plinth 27. In this construction shelves 28 are supported by brackets on each side of the panel. Accordingly, the slots on one side of the panel would be staggered relative to those on the other side so that shelving brackets can be hung from the panel at the same height on both of its sides. As will be apparent, a free-standing unit may be constructed to support shelves or other display supports on one side only.

Instead of a single metal strip being incorporated in a batten, a number of individual strips or other metal inserts could be provided.

Referring now to FIGURE 10, the alternative panel shown therein is generally referenced 29 and carries a pair of vertical metal strips 30 (only one of which is illustrated) which are spaced apart across the panel, similarly to the strips 7 in the previous embodiment, and extend almost the height of the panel. The strips 30 are accommodated within the thickness of the panel, and for this purpose the back face of the panel, that is to say the panel face which is intended to be presented to the wall when the panel is installed, has a pair of vertical recesses 31, one for each strip. The strips are secured in their respective recesses by pairs of wood screws 32 provided at suitable vertical intervals, the strips being countersunk to receive the heads of the screws.

Each metal strip 2 is provided with vertically spaced slots 8 arranged in sets of three or otherwise, as wished, as in the previous embodiment. Again, each set of slots is capable of receiving a standard bracket 10 of the hook type conventionally used in shop fitting. To provide access to each set of slots 8 from the front or display face of the panel and so enable a bracket to be hooked into the slots, the panel itself is formed with a number of slots 33 corresponding to the number of sets of slots 8. The slots 8 and 33 are of similar width, and the slots 33 are provided through the panel from its front face to the appropriate recess 31 in the back face of the panel in general alignment with the respective sets of slots 8.

It is to be noted that the depth of each panel recess 31 is made greater than the thickness of that part of a hook 11 of the bracket lying inwardly of the metal strip 30 so that such element is contained within the thickness of the panel and does not project beyond its back face to provide a hindrance to mounting of the panel.

The panel is made relatively thick compared with facing panels in current use in order to accommodate the hooks of the bracket, as described, and to give the panel added strength which is necessary since the panel itself has to take the weight and moment of the merchandise and fittings which it supports through the metal strips and support brackets.

In a typical example, the metal strips are inserted by about ¾" from the front face of the panel and the slots are only ⁵⁄₃₂" in width, so it will be appreciated that the metal strips are substantially hidden from view. This basic construction therefore enables a panel of attractive frontal appearance to be constructed.

Whilst the support for the shelving brackets has been described as taking the form of a pair of metal strips each extending generally the height of a panel, the invention is not limited to that construction nor to the actual fixing means described. The bracket supports in the panel could take any suitable form and be fixed thereto in any suitable way. For example, the supports could comprise, instead of a strip, a plurality of smaller length die cast inserts each substantially the length of a slot in the front face of the panel. In this case, the inserts could be fitted into individual recesses provided in the back face of the panel rather than utilizing a "continuous" single recess, as described. Whether a single metal strip is utilized or a number of inserts, the form of support could be incorporated in the panel when the panel is actually constructed. Thus, if the panel is of laminated construction, the support could be positioned between the laminations, which would be suitably adopted to receive the support, and secured in position when the laminations are bonded to form a single sheet.

The panel could be suitably of blockboard or plywood although other materials are not excluded. A plastic sheet facing for one or both faces of the panel could be utilized, decorated or plain as wished. When a facing is provided on the back face of the panel, the recesses in the illustrated panel receiving the metal support strips would be covered over.

Desirably, in both the described embodiments of panel the single metal strip or inserts are constructed of simple rectangular cross-section, as shown, which lends itself to inexpensive production.

Whilst the only fitting described is a shelving bracket there are many other standard fittings having hook-like attachment elements made which may be used with the panels. Thus, for example, the fittings may constitute brackets for hanging rails or display bars, or canopy and soffit brackets.

FIGURES 11 and 12 show arrangements providing for greater vertical adjustment of the brackets than in the previous constructions. The increased adjustment is obtained by constructing the brackets so that they may not only be hooked into the slots in any one set but also mounted so as to bridge adjacent sets. Thus, the strip 7 (or 30) has equally spaced slots 8 arranged in pairs, in one example, within a slot 12 in the front sheet 4. The batten 3 would be likewise slotted. Between alternate slots 12 is provided a fixing hole 18 so that the frontal appearance is as shown in the right hand pattern of FIGURE 12 and that of FIGURE 1. The bracket 10 has two hooks 11 which may be hooked into any adjacent pair of strip slots 8, the hooks either both being received in one slot 12 or the bracket bridging adjacent slots 12 with the hooks one in the upper slot and the other in the lower. Instead of one slot 12 per pair of slots 8, the front sheet and batten could have a slot 12a for each strip slot 8 suitably lengthened downwardly of that slot to permit the bracket to be slid into its engaged position. With that arrangement, the patterning of the front sheet would be as shown in the left hand part of FIGURE 12, i.e., a dash-dash-dot-dash-dash repeated pattern.

The vertical adjustments available to the bracket are referenced $B_1$, $B_2$, $B_3$ in FIGURE 12. In one construction, the slots 8 are ¾ inch long with a pitch of 2½ inches, and the slots 12 are 3⅝ inches long; alternatively the slots 12a are 1⅛ inches long. Thus, the bracket can be vertically adjusted every 2½ inches.

In FIGURE 13, the bracket 10 has only an upper hook 11 engaging in a strip slot 8, the lower hook being replaced by a heel 34 which engages the front face of the metal strip 7 (or 30) to steady the bracket. As will be appreciated, the bracket may be used with the panel of FIGURES 11 and 12. It should be noted that both types of brackets have a cut-back edge 35 to provide clearance relative to a bush 19 when the bracket is mounted with its hooks or hook and heel either side of the bush.

In summary, a facing or stock panel constructed as described incorporates built-in metalwork or other secured support means by which standard fittings of the hook-type as for displaying merchandise may be hung from the panel. The panel is fully formed when made-up in a factory so that the only site work involved in installing the panel ready to take fittings is the actual fixing of the panel in position.

I claim:
1. A panel comprising
   a peripheral frame;
   a plurality of spaced vertical battens mounted within said frame, each of said battens comprising a pair of longitudinal sections secured together along a common joint line and containing opposed slots defining a vertical channel;
   metal bracket support elements mounted in each of said vertical channels, respectively, each of said bracket support elements being of rectangular cross-section and containing a plurality of vertically spaced apertures adapted to receive the hook portions of a bracket for connecting the same in a number of selected vertical positions relative to the panel, respectively, one section of each batten section pair containing adjacent said joint line a plurality of vertically spaced recesses each defining an entry slot affording communication with at least one aperture contained in the corresponding bracket support element; and
   filler means filling the spaces between said battens and the peripheral frame.

2. Apparatus as defined in claim 1, and further wherein said battens and said bracket support elements contain aligned marking and fixing apertures adapted to receive fixing screws for securing the panel to a vertical surface, the head portions of said screws being adapted to engage said bracket support element.

3. The panel set forth in claim 2, including a bush in each of said apertures on one side of said bracket support element.

4. A panel set forth in claim 1, and further including facing sheets on opposite faces of said frame and battens, respectively, and means defining in one of said sheets entry slots permitting access by said bracket hook portions to the hook receiving apertures contained in said metal elements, respectively.

5. A panel as defined in claim 1, wherein the hook receiving apertures contained in said bracket support elements are equally spaced, and further wherein said batten entry slots are each aligned with an adjacent pair of said hook receiving apertures, respectively, whereby a bracket having a pair of spaced hook portions may be alternately mounted vertically in a first position in which the hook portions engage both apertures associated with one entry slot, and in a second position in which the hook portions engage apertures associated with successive slots, respectively.

6. The panel as defined in claim 1, wherein said slots in said bracket support element are equally spaced, and means defining in said panel entry slots aligned with and slightly longer than said hook receiving apertures, whereby a hooked bracket having two hooks may be mounted with such hooks received in any adjacent pair of said hook receiving apertures.

7. The panel as defined in claim 1, and further including means defining additional slot means extending through said bracket support elements for enabling said panel to be hung against a vertical surface.

8. The panel set forth in claim 1, incorporating a plurality of said bracket support elements staggered with respect to one another widthwise of the panel such that hooked brackets can be engaged to the panel on opposite sides thereof.

References Cited
UNITED STATES PATENTS

| | | | |
|---|---|---|---|
| 1,741,366 | 12/1929 | Hurxthal | 52—617 |
| 2,252,997 | 8/1941 | Vanderveld | 248—243 |
| 2,291,176 | 7/1942 | Vanderveld | 248—243 X |
| 2,607,447 | 8/1952 | Tuttle | 52—617 |
| 2,747,826 | 5/1956 | Fisher | 248—243 |
| 2,941,775 | 6/1960 | Arnit | 248—243 |
| 3,190,243 | 6/1965 | Pira | 108—152 |
| 3,352,428 | 11/1967 | Sak et al. | 218—87 |

ROY D. FRAZIER, Primary Examiner

U.S. Cl. X.R.

52—36, 617; 248—243